United States Patent
Hu et al.

(10) Patent No.: US 10,538,436 B2
(45) Date of Patent: Jan. 21, 2020

(54) ELECTROLYTIC REDUCTION MODULE AND WATER PURIFICATION DEVICE

(71) Applicant: Industrial Technology Research Institute, Hsinchu (TW)

(72) Inventors: Po-Yu Hu, Taichung (TW); Teh-Ming Liang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 146 days.

(21) Appl. No.: 15/672,305

(22) Filed: Aug. 9, 2017

(65) Prior Publication Data

US 2018/0346353 A1  Dec. 6, 2018

(30) Foreign Application Priority Data

Jun. 5, 2017 (TW) .............................. 106118565 A (51) Int. Cl.
*C02F 1/467* (2006.01)
*C02F 1/461* (2006.01)
*C02F 101/12* (2006.01)

(52) U.S. Cl.
CPC ........ *C02F 1/4676* (2013.01); *C02F 1/46109* (2013.01); *C02F 2001/46133* (2013.01); *C02F 2001/46152* (2013.01); *C02F 2101/12* (2013.01); *C02F 2201/4611* (2013.01); *C02F 2301/028* (2013.01); *C02F 2303/185* (2013.01)

(58) Field of Classification Search
None
See application file for complete search history.

(56) References Cited

U.S. PATENT DOCUMENTS

| | | | |
|---|---|---|---|
| 5,167,777 A * | 12/1992 | Kaczur | C02F 1/46114 205/633 |
| 5,256,268 A | 10/1993 | Goto et al. | |
| 5,961,803 A | 10/1999 | Landfors et al. | |
| 6,024,850 A | 2/2000 | Sampson et al. | |
| 6,048,380 A | 4/2000 | Asanuma et al. | |
| 6,113,779 A | 9/2000 | Snee | |
| 6,416,645 B1 | 7/2002 | Sampson et al. | |
| 6,607,668 B2 | 8/2003 | Rela | |

(Continued)

FOREIGN PATENT DOCUMENTS

CN  201923864  8/2011
JP  S5717573  1/1982

(Continued)

OTHER PUBLICATIONS

"Baffle", Merriam-Webster, accessed at http://www.merriam-webster.com/dictionary/baffle on Feb. 25, 2019 (Year: 2019).*

(Continued)

*Primary Examiner* — Harry D Wilkins, III
(74) *Attorney, Agent, or Firm* — JCIPRNET (57) ABSTRACT

An electrolytic reduction module and a water purification device are provided. The electrolytic reduction module includes an electrode set, a first baffle, and a second baffle. The electrode set includes an anode, a first cathode, and a second cathode. The anode is disposed between the first cathode and the second cathode. The first cathode is disposed between the first baffle and the anode. The second cathode is disposed between the second baffle and the anode.

16 Claims, 4 Drawing Sheets

(56) References Cited

U.S. PATENT DOCUMENTS

| | | |
|---|---|---|
| 6,821,648 B2 | 11/2004 | Kido et al. |
| 7,048,862 B2 | 5/2006 | Fukui et al. |
| 7,531,709 B2 | 5/2009 | Scalzi et al. |
| 7,662,499 B2 * | 2/2010 | Huber ................. H01M 8/0206 |
| | | 429/434 |
| 2003/0062268 A1 * | 4/2003 | Kosek ....................... C25B 1/04 |
| | | 205/637 |
| 2013/0115684 A1 | 5/2013 | Rittmann et al. |
| 2014/0102887 A1 | 4/2014 | Podobedov |

FOREIGN PATENT DOCUMENTS

| | | |
|---|---|---|
| JP | S57203783 | 12/1982 |
| JP | H04219193 | 8/1992 |
| JP | H1053886 | 2/1998 |
| JP | 2001504383 | 4/2001 |
| JP | 2003251358 | 9/2003 |
| JP | 2005103518 | 4/2005 |
| JP | 2006342394 | 12/2006 |
| JP | 2012012695 | 1/2012 |
| JP | 2013000709 | 1/2013 |
| JP | 2013194296 | 9/2013 |
| JP | 2017057482 | 3/2017 |
| TW | 490444 | 6/2002 |
| TW | I518039 | 1/2016 |

OTHER PUBLICATIONS

"Office Action of Taiwan Counterpart Application," dated Dec. 13, 2017, p. 1-p. 7, in which the listed references were cited.
"Office Action of Japan Counterpart Application," dated Jun. 19, 2018, p. 1-p. 3.

* cited by examiner

ELECTROLYTIC REDUCTION MODULE AND WATER PURIFICATION DEVICE

CROSS-REFERENCE TO RELATED APPLICATION

This application claims the priority benefit of Taiwan application no. 106118565, filed on Jun. 5, 2017. The entirety of the above-mentioned patent application is hereby incorporated by reference herein and made a part of this specification.

TECHNICAL FIELD

The disclosure relates to an electrolytic reduction module and a water purification device.

BACKGROUND

When being transported or stored, water for household use may be polluted by inorganic substances or organic substances during transportation or in the storage environment, a great amount of substances harmful to a human body can thus be found in water for household use, such as bacteria, viruses, or other microorganisms which can cause water deterioration. Accordingly, in order to enable water for household use to reach standard of general use, chemicals (germicides or detergents) are added most of the time in water for household use, for example, sodium chlorate may be added, or gaseous chlorine may be introduced to water. Moreover, with the oxidation reaction in water body through adding sodium chlorate or introducing gaseous chlorine, free available residual chlorine (HOCl+OCl$^-$) or other oxidation substances may exist in water, so as to ensure that no bacteria are breeding or other harmful substances exist in water before use.

Nevertheless, in the process of deodorization and sterilization through adding chlorine, organic substances in water may react with free available residual chlorine, and trihalomethanes are thus formed. Trihalomethanes are volatile organic compounds with a boiling point of approximately 40° C. As such, when water containing trihalomethanes reaches a temperature higher than the boiling point of trihalomethanes, trihalomethanes vaporize and are likely to enter human body via respiration or dermal absorption; as a result, the central nervous system of the human body declines in function, leading to symptoms such as dizziness, fatigue, headache, liver toxicity, and renal toxicity. Besides, uptake of excessive level of trihalomethanes may even cause cancer in humans.

Accordingly, after chlorine is added to water for sterilization, free available residual chlorine in water needs to be removed through a dechlorination device. Nevertheless, a conventional dechlorination device has a complex structure and a considerable large size, and thus, the conventional dechlorination device is suitable to be installed in specific places in order to be used. For instance, in a general household, the conventional dechlorination device is suitable to be installed in the accommodation space under the sink for water to be dechlorinated. Furthermore, the conventional dechlorination device is filled with calcium sulfite or zinc-copper alloy as an adsorbent to adsorb free available residual chlorine in water. Nevertheless, the filled absorbent may contaminate water after the water is in contact with the absorbent for a long period of time, and thus, the absorbent in the dechlorination device has to be replaced periodically. Moreover, significant amount of operational power is needed to ensure smooth running of the conventional dechlorination device, and thus, costs of the conventional dechlorination device considerably increase accordingly. As such, the conventional dechlorination device is not widely applicable to other types of water supply equipment as limited by its large size and excessive energy consumption.

To sum up, a device with high efficiency and a simple structure to remove free available residual chlorine in water is needed urgently nowadays. Such device is to be widely applied to facilities for household use, so as to prevent free available residual chlorine in water from bring harm to the human body.

SUMMARY

The disclosure provides to an electrolytic reduction module including an electrode set, a first baffle, and a second baffle. The electrode set includes an anode, a first cathode, and a second cathode. The anode is disposed between the first cathode and the second cathode. The first cathode is disposed between the first baffle and the anode. The second cathode is disposed between the second baffle and the anode.

The disclosure provides a water purification device including a housing and a plurality of electrolytic reduction modules. The housing includes a water inlet and a water outlet. Each of the electrolytic reduction modules includes an electrode set, a first baffle, and a second baffle. The first baffle or the second baffle is shared by adjacent two of the electrolytic reduction modules. The electrode set includes an anode, a first cathode, and a second cathode. The anode is disposed between the first cathode and the second cathode. The first cathode is disposed between the first baffle and the anode. The second cathode is disposed between the second baffle and the anode.

Several exemplary embodiments accompanied with figures are described in detail below to further describe the disclosure in detail.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Several exemplary embodiments will be provided below for describing the disclosure with reference to the accompanying drawings. The same reference numerals in the drawings are used for representing the same or similar elements in the following embodiments. It is worth noting that the drawings have been simplified for clearly illustrating the contents of the embodiments, and the size ratio on each drawing is not illustrated proportionally to the actual product. Thus, the drawings shall not construe any limitations to the scope of the disclosure.

Figure 1:
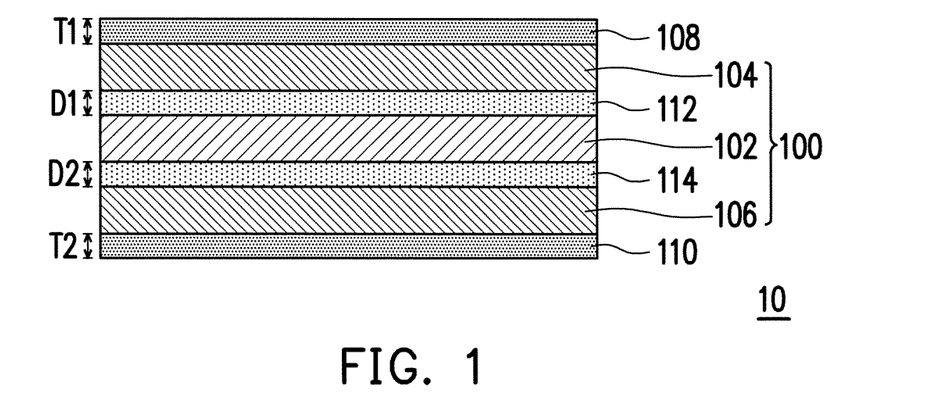
FIG. 1 is a schematic cross-sectional view of an electrolytic reduction module according to an exemplary embodiment of the disclosure.
Figure 2:
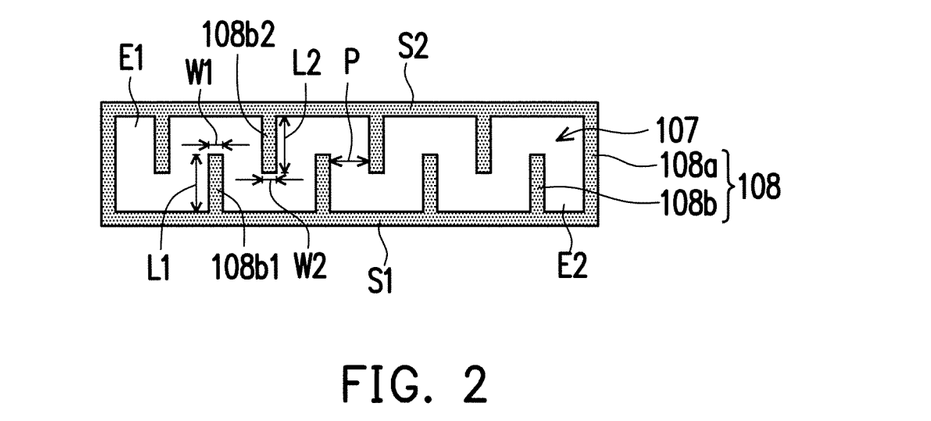
FIG. 2 is a top view of a baffle of an electrolytic reduction module according to an exemplary embodiment of the disclosure.

FIG. 1 is a schematic cross-sectional view of an electrolytic reduction module according to some exemplary embodiments of the disclosure. FIG. 2 is a top view of a baffle of an electrolytic reduction module according to some exemplary embodiments of the disclosure.

Referring to FIG. 1, an electrolytic reduction module 10 provided by the embodiments of the disclosure includes an electrode set 100, a first baffle 108, and a second baffle 110. The electrode set 100 includes an anode 102, a first cathode 104, and a second cathode 106.

In some embodiments, the first cathode 104, the anode 102, and the second cathode 106 are stacked into a sandwich structure. In other words, the anode 102 is sandwiched between the first cathode 104 and the second cathode 106. The anode 102 may include a material having a low hydrogen evolution potential and is not easy to generate substances in electrolysis reaction, for example. For example, the material of the anode 102 includes a material selected from a group consisting of metal, metal alloy, metal oxide, or metal-doped metal oxide. In some embodiments, the material of the anode 102 includes copper (Cu), zinc (Zn), lead (Pb), aluminum (Al), gold (Au), platinum (Pt), or a combination of the foregoing, for example. In some other embodiments, the material of the anode 102 includes metal oxide, such as iridium oxide ($IrO_2$), ruthenium oxide ($RuO_2$), and lead oxide ($PbO_2$). In still other embodiments, the material of the anode 102 includes metal-doped metal oxide, such as titanium-based iridium oxide ($Ti/IrO_2$) and titanium-based tantalum oxide ($Ti/Ta_2O_5$). In some exemplary embodiments, the material of the anode 102 includes titanium-based iridium oxide with an oxygen evolution potential ranging from 0.8 V to 1.3 V in an aqueous solution of 0.2 wt % NaClO. Platinum is commonly used as the anode 102 of an electrolytic reduction module. However, since a chlorine evolution potential of platinum is far less than an oxygen evolution potential of platinum, chloride precipitation easily occurs at the anode. In some embodiments of the disclosure, titanium-based iridium oxide is used as the anode 102. Since an oxygen evolution potential of titanium-based iridium oxide is closer to a chlorine evolution potential of titanium-based iridium oxide, compared to the electrolytic reduction module using platinum as the anode 102, oxygen is easier to be generated when titanium-based iridium oxide is used as the anode 102 in the disclosure, and chloride precipitation of the disclosure is thus reduced. In addition, when the anode 102 of titanium-based iridium oxide undergoes oxidation reaction, no substance is generated in an electrolytic solution, and thereby, performance of the electrolytic reduction module 10 removing free available residual chlorine from water is prevented from being affected. The foregoing "oxygen evolution potential" and "chlorine evolution potential" respectively refer to that potentials at which the anode 102 generates oxygen and chlorine when water undergoes electrolysis reaction.

The first cathode 104 is disposed between the first baffle 108 and the anode 102, and the second cathode 106 is disposed between the second baffle 110 and the anode 102. The first cathode 104 and the second cathode 106 may include a material having, for example, a lower hydrogen evolution potential and a greater specific surface area. A hydrogen evolution potential of the material suitable for the first cathode 104 and the second cathode 106 ranges from −1.9 V to −2.4 V in the aqueous solution of 0.2 wt % NaClO. A ratio of the specific surface areas of the first cathode 104 to the second cathode 106 is, for example, 1:1. In some embodiments, the materials of the first cathode 104 and the second cathode 106 includes, for example, carbon, stainless steel, platinum (Pt), titanium (Ti), iridium oxide ($IrO_2$), mercury (Hg), or a combination of the foregoing in a form of an oxide or an alloy thereof. In some embodiments, the materials of the first cathode 104 and the second cathode 106 include a carbon material such as graphite, diamond, carbon nanotube, carbon nanocapsule, carbon 60, carbon 80, and carbon 120. In an exemplary embodiment, the materials of the first cathode 104 and the second cathode 106 include graphite felt. In some exemplary embodiments, the hydrogen evolution potentials of the first cathode 104 and the second cathode 106 using graphite felt as the material in the aqueous solution of NaClO 0.2 wt % ranges from −1.9 V to −2.5 V. Among various viable materials of the first cathode 104 and the second cathode 106, graphite felt has a greater specific surface area. Thus, when graphite felt is selected as the first cathode 104 and the second cathode 106, a higher rate of electrolytic reduction reaction is achieved, and efficiency of the electrolytic reduction module 10 removing free available residual chlorine from water is thus be enhanced. The foregoing "hydrogen evolution potentials" refer to potentials at which the first cathode 104 and the second cathode 106 generate hydrogen when water undergoes electrolysis reaction.

The specific surface areas of the first cathode 104 and the second cathode 106 are respectively greater a specific surface area of the anode 102. When the specific surface areas of the first cathode 104 and the second cathode 106 are 2 to 10 times of the specific surface area of the anode 102, a contact area between the first cathode 104 and the second cathode 106 and water containing free available residual chlorine is increased. In other words, rates of electrolytic reduction reaction at the first cathode 104 and the second cathode 106 are thus increased, so as to enhance efficiency of removing free available residual chlorine in water. In some embodiments, specific surface areas of the first cathode 104 and the second cathode 106 are respectively 2 to 10 times of the specific surface area of the anode 102. In some exemplary embodiments, the specific surface areas of the first cathode 104 and the second cathode 106 are respectively $10^6$ times of the specific surface area of the anode 102.

In some embodiments, in the electrolytic reduction module 10, a first distance D1 between the first cathode 104 and the anode 102 is 1 mm, and a distance D2 between the second cathode 106 and the anode 102 is 1 mm. The first distance D1 and the second distance D2 are respectively proportional to a resistance of the electrolytic reduction module 10. In some embodiments, the first distance D1 and the second distance D2 are respectively 1 mm to 2 mm or less. In some exemplary embodiments, the first distance D1 and the second distance D2 are respectively 1 mm or less. When the first distance D1 and the second distance D2 (the distance between the first cathode 104 and the anode 102 and the distance between the second cathode 106 and the anode 102) are controlled to fall in the foregoing range, the electrolytic reduction module 10 may be implemented accordingly. Moreover, with the low first distance D1 and the low second distance D2, the resistance of the electrolytic reduction module 10 is lower and electrolytic performance is higher, and that efficiency of removing free available residual chlorine from water is enhanced.

The first baffle 108 and the second baffle 110 are disposed at outer sides of the first cathode 104 and the second cathode 106. In some embodiments, the first baffle 108 and the second baffle 110 are disposed at outermost sides of the electrolytic reduction module 10. The first baffle 108 and the second baffle 110 are flexible, for example. Materials of the first baffle 108 and the second baffle 110 include an insulation material, such as an inorganic material. The materials of the first baffle 108 and the second baffle 110 include, for example, oxide, nitride, oxynitride, or a combination of the foregoing. In an exemplary embodiment, the materials of the first baffle 108 and the second baffle 110 include, for example, glass. In some other embodiments, the materials of the first baffle 108 and the second baffle 110 include, for example, an organic material. The materials of the first baffle 108 and the second baffle 110 include, for example, polymethylmethacrylate (PMMA), polypropylene (PP), polystyrene (PS), tetraethyl orthosilicate (TEOS), or a combination of the foregoing. In some exemplary embodiments, the materials of the first baffle 108 and the second baffle 110 may include, for example, acrylic or plastic.

Structures, configurations, and thicknesses of the first baffle 108 and the second baffle 110 may be identical or may be different. For the ease of illustration, the first baffle 108 is described in the following as an example with reference to FIG. 2.

Referring to FIG. 2, the first baffle 108 has an opening 107, and water may flow in the opening 107. In some embodiments, the opening 107 of the first baffle 108 has a meandering shape, such as a square waveform, a sine waveform, or a snake form. In FIG. 2, the opening 107 of the first baffle 108 is, for example, a square waveform. The opening 107 includes, for example, a first end E1 and a second end E2. The first end E1 is, for example, a starting end where water flows into the first baffle 108, and the second end E2 is, for example, an end point where water flows out of the first baffle 108.

From another aspect, in some embodiments, the first baffle 108 includes an outer frame 108a and a plurality of extending portions 108b. The outer frame 108a is, for example, shaped as a rectangle, a circle, or an ellipse. The extending portions 108b are, for example, strip-shaped, fin-shaped, or wave-shaped. In an exemplary embodiment, the outer frame 108a is rectangle-shaped, and the extending portions 108b are strip-shaped. The extending portions 108b are connected to the outer frame 108a and extend in an area enclosed by the outer frame 108a. The extending portions 108b include a plurality of first extending portions 108b1 and a plurality of second extending portions 108b2. In some embodiments, the first extending portions 108b1 are arranged in a row, parallel to each other, and connected to a side S1 of the outer frame 108a to form a first comb-like shape, and the second extending portions 108b2 are arranged in a row, parallel to each other, and connected to another side S2 of the outer frame 108a to form a second comb-like shape. In some other embodiments, the first extending portions 108b1 are arranged in a row, are not parallel to each other, and are connected to the side S1 of the outer frame 108a to form a first fin-like shape, and the second extending portions 108b2 are arranged in a row, are not parallel to each other, and are connected to the side S2 of the outer frame 108a to form a second fin-like shape. From another aspect, the first extending portions 108b1 and the second extending portions 108b2 are alternatively arranged to form a fork-like shape, and meandering gaps exist between fork points. Water may flow through the meandering gaps between the fork points, so as to increase a contact area with the first cathode 104 and the second cathode 106.

A distance P between any adjacent first extending portion 108b1 and second extending portion 108b2 may be identical or different according to the flowing of water. First lengths L1 of the respective first extending portions 108b1 may be identical or different, second lengths L2 of the respective second extending portions 108b2 may be identical or different, and the first length L1 and the second length L2 may be identical or different. In addition, first widths W1 of the respective first extending portions 108b1 may be identical or different, second widths W2 of the respective second extending portions 108b2 may be identical or different, and the first width W1 and the second width W2 may identical or different. The numbers of the first extending portions 108b1 and the second extending portions 108b2 may be designed according to actual requirements. Generally, the numbers of the first extending portions 108b1 and the second extending portions 108b2 are proportional to a size of the first baffle 108. When the numbers of the first extending portions 108b1 and the second extending portions 108b2 are greater, time of liquid remaining in the first baffle 108 is increased. Thus, time of water being in contact with the first cathode 104 when flowing in the first baffle 108 is increased. Certainly, when the number of the first extending portions 108b is overly large, the manufacturing cost of the first baffle 108 is increased. In some embodiments in which the size of the first baffle 108 is 16 cm×5.4 cm, the numbers of the first extending portions 108b1 and the second extending portions 108b2 are respectively 4 to 12. When the numbers of the first extending portions 108b1 and the second extending portions 108b2 correspond to the size of the first baffle 108 and thus fall in the foregoing range, a balance may be obtained between the time of water remaining in the first baffle 108 and the manufacturing costs of the first baffle 108, and efficiency of removing free available residual chlorine in water is further enhanced. In an exemplary embodiment, the numbers of the first extending portions 108b1 and the second extending portions 108b2 are respectively 4.

A shape design of the first baffle 108 prolongs the time of water remaining in the first baffle 108, and that time of water being in contact with the first cathode 104 when water flows in the first baffle 108 is increased. In other words, the shape design of the first baffle 108 increases the time of free available residual chlorine undergoes reduction reaction, so efficiency of removing free available residual chlorine in water is enhanced. Furthermore, a structure and a shape design of the second baffle 110 may be identical to that of the first baffle 108, and detailed descriptions in this regard are not further provided hereinafter.

The first baffle 108 and the second baffle 110 respectively have a first thickness T1 and a second thickness T2. The first thickness T1 and the second thickness T2 (the respective thicknesses of the first baffle 108 and the second baffle 110) may influence a containable amount of water and the resistance of the electrolytic reduction module 10. When the first thickness T1 and the second thickness T2 increase, the first baffle 108 and the second baffle 110 are able to contain a greater amount of water, but the resistance of the electrolytic reduction module 10 increases as well; nevertheless, when the first thickness T1 and the second thickness T2 decrease, the resistance of the electrolytic reduction module 10 decreases, but relatively the containable amount of water in the first baffle 108 and the second baffle 110 decreases. In some embodiments, the first thickness T1 and the second thickness T2 are respectively 1 mm to 2 mm. When the first thickness T1 and the second thickness T2 fall in the foregoing range, a balance may be obtained between the containable amount of water in the first baffle 108 and the second baffle 110 and the resistance of the electrolytic reduction module 10, and that efficiency of removing free available residual chlorine in water is further enhanced. In an exemplary embodiment, the first thickness T1 and the second thickness T2 are respectively 2 mm.

In some embodiments, under the premise of not hindering water flow in the electrolytic reduction module 10, the electrolytic reduction module 10 may further include a first isolation structure 112 and a second isolation structure 114 (as shown in FIG. 1). The first isolation structure 112 is disposed between the anode 102 and the first cathode 104, and the second isolation structure 114 is disposed between the anode 102 the second cathode 106. In the electrolytic reduction module 10 according to an exemplary embodiment, the first isolation structure 112 and the second isolation structure 114 may respectively isolate the anode 102 from the first cathode 104 and isolate the anode 102 from the second cathode 106. A material of the first isolation structure 112 and the second isolation structure 114 includes, for example, an isolation material. In some embodiments, the materials of the first isolation structure 112 and the second isolation structure 114 include, for example, an inorganic material. For instance, the materials of the first isolation structure 112 and the second isolation structure 114 include oxide, nitride, oxynitride, or a combination of the foregoing. In an exemplary embodiment, the materials of the first isolation structure 112 and the second isolation structure 114 include, for example, glass. In some other embodiments, the materials of the first isolation structure 112 and the second isolation structure 114 include, for example, an organic material. For instance, the materials of the first isolation structure 112 and the second isolation structure 114 include polymethylmethacrylate, polypropylene, polystyrene, tetraethyl orthosilicate, or a combination of the foregoing. The first isolation structure 112 and the second isolation structure 114 are in form of, for example, a mesh, a pad, a porous structure, or a combination of the foregoing. A form of the first isolation structure 112 and a form of the second isolation structure 114 may be identical or different. In some embodiments, the first isolation structure 112 and the second isolation structure 114 are in form of a mesh or a porous structure. In some other embodiments, the first isolation structure 112 and the second isolation structure 114 are in form of a pad.

Figure 3:
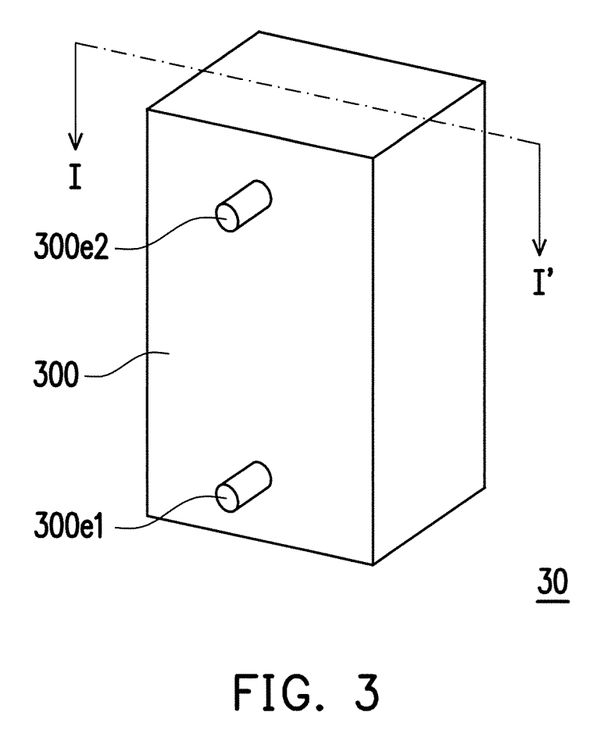
FIG. 3 is a schematic view of an appearance of a water purification device according to an exemplary embodiment of the disclosure.
Figure 4:
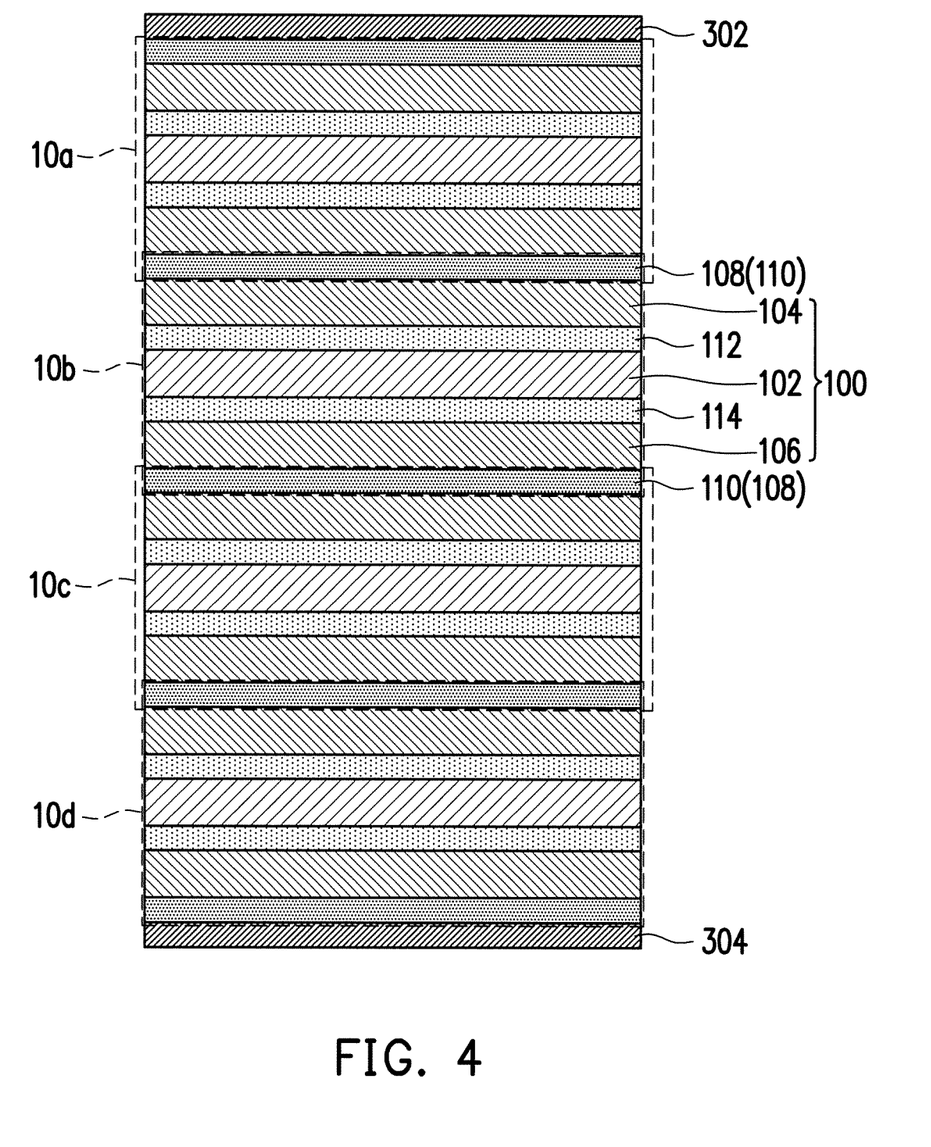
FIG. 4 is a schematic cross-sectional view of the water purification device disclosed in FIG. 3 along a cross-sectional line I-I'.

FIG. 3 is a schematic view of an appearance of a water purification device according to an exemplary embodiment of the disclosure. FIG. 4 is a schematic cross-sectional view of the water purification device disclosed in FIG. 3 along a cross-sectional line I-I'. An electrolytic reduction module in the water purification device shown in FIG. 3 and FIG. 4 is identical to the electrolytic reduction module shown in FIG. 1, and the same reference numerals are used to represent the same components.

Referring to FIG. 3 and FIG. 4, in some embodiments, a water purification device 30 includes a housing 300 and a plurality of electrolytic reduction modules 10a, 10b, 10c, and 10d. The housing 300 includes a water inlet 300e1 and a water outlet 300e2. The water inlet 300e1 and the water outlet 300e2 may be connected to a pipeline (not shown) configured to transport water, so as to respectively enable water to flow in the water purification device 30 and flow out of the water purification device 30. In some embodiments, the water inlet 300e1 and the water outlet 300e2 are located on a same surface of the housing 300. In some other embodiments, the water inlet 300e1 and the water outlet 300e2 are located on opposite surfaces of the housing 300 (not shown). In addition, in some embodiments, a level height of the water inlet 300e1 is lower than a level height of the water outlet 300e2. The electrolytic reduction modules 10d, 10c, 10b, and 10a are disposed in the housing 300 and are arranged in parallel, such as being stacked from bottom up, as shown in FIG. 3. In the water purification device 30 disclosed in FIG. 4, the water purification device 30 includes four electrolytic reduction modules 10d, 10c, 10b, and 10a, but the disclosure is not limited thereto. In other words, a water purification device may include less than four or more than four electrolytic reduction modules.

In the water purification device 30, components constituting the electrolytic reduction modules 10a, 10b, 10c, and 10d, relationships of the components, and materials selected for the components are, for example, similar to that of the electrolytic reduction module 10 in the foregoing embodiment, and thus, details are not repeated hereinafter. A difference therebetween is described as follows.

Referring to FIG. 4, in some embodiments, the first baffle 108 is shared by the adjacent electrolytic reduction module 10a and electrolytic reduction module 10b, and the second baffle 110 is shared by the adjacent electrolytic reduction module 10b and electrolytic reduction module 10c. Thus, components disposed in the water purification device 30 are reduced. From another aspect, the second baffle 110 may be omitted in the electrolytic reduction module 10a, and the first baffle 108 may be omitted in the electrolytic reduction module 10c. As such, sharing of the first baffle 108 and the second baffle 110 between the adjacent electrolytic reduction modules simplifies a structure of the water purification device 30 and reduces costs of forming the water purification device 30.

In some embodiments, the water purification device 30 further includes a first water blocking pad 302 and a second water blocking pad 304. The first water blocking pad 302 and the second water blocking pad 304 are disposed on outermost peripherals of the water purification device 30. In other words, the electrolytic reduction modules 10a, 10b, 10c, and 10d are disposed between the first water blocking pad 302 and the second water blocking pad 304. In some embodiments, materials of the first water blocking pad 302 and the second water blocking pad 304 include, for example, an organic material. For instance, the materials of the first water blocking pad 302 and the second water blocking pad 304 include an organic material such as polypropylene, polystyrene, or a combination of the foregoing. In some other embodiments, the materials of the first water blocking pad 302 and the second water blocking pad 304 include, for example, an inorganic material. For instance, the materials of the water blocking pad 302 and the second water blocking pad 304 include an inorganic material such as silicon compound, aluminum oxide, nitrogen oxide, or a combination of the foregoing. In an exemplary embodiment, the materials of the first water blocking pad 302 and the second water blocking pad 304 include silica gel. The first water blocking pad 302 and the second water blocking pad 304 are able to prevent water from overflowing from a channel other than the first baffle 108 and the second baffle 110, so as to enhance efficiency of removing free available residual chlorine from water.

Feasibility of the embodiments of the disclosure is authenticated through examples as follows, but it is worth noting that the water purification device provided by the embodiments of the disclosure is not limited thereto.

Example 1

In the present example, the embodiment of FIG. 4 is taken for example, and the water purification device 30 includes four electrolytic reduction modules 10a, 10b, 10c, and 10d. From another aspect, the water purification device 30 includes four anodes and eight cathodes disposed alternatively. A material of the anodes of the water purification device 30 includes titanium-based iridium oxide, and the anodes are sheet-like mesh electrodes. Materials of the cathodes of the water purification device 30 include graphite felt, and the cathodes include porous electrodes with great specific surface areas (compared to the conventional cathode material). In the present example, in the water purification device 30, a thickness of each of the anodes is 0.5 μm, a thickness of each of the cathodes is 3.5 mm, a thickness of each of the baffles is 2 mm, and a length, a width, and a height of the water purification device 30 respectively are 16 cm, 5.4 cm, and 2.2 cm. In the water purification device 30, water introduced flows at a rate of 229 litre/minute and remains in the water purification device 30 for 1.98 seconds.

After water containing hypochlorite flowed into the water purification device 30 from the water inlet 300e1, a power was applied to the water purification device 30 through a power generation device. Accordingly, water in the purification device 30 received the power and underwent electrolysis reaction. Here, oxidation reaction occurred at the anodes, and reduction reaction occurred at the cathodes. The power generation device in the present example is a conventional power generation device, and thus, detailed descriptions of the structure thereof are not further provided.

An oxidation half-reaction equation, a reduction half-reaction equation, and an oxidation reduction total-reaction equation of electrolysis reaction of water containing hypochlorite are as follows.

Oxidation half-reaction equation: $2H_2O_{(l)} \rightarrow {}^*O_{2(g)} + 4H^+_{(aq)} + 4e^-$;

Reduction half-reaction equation: $OCl^-_{(aq)} + H_2O_{(l)} + 2e^- \rightarrow Cl^-_{(aq)} + 2OH^-_{(aq)}$;

Oxidation reduction total-reaction equation: $4H_2O_{(l)} + 2OCl^-_{(aq)} \rightarrow O_{2(g)} + 2Cl^-_{(aq)} + 4H^+_{(aq)} + 4OH^-_{(aq)}$.

After water containing hypochlorite flowed into the water purification device 30 from the water inlet 300e1 and the power generation device applied different currents and voltages to the water, a pH value, an oxidation reduction potential, and a content of hypochlorite of water flowing out of the water outlet 300e2 of the water purification device 30 were measured after 60 seconds, 120 seconds, and 180 seconds, so as to calculate a removal rate of hypochlorite.

Table 1 to Table 3 in the following show relations between power applied and the removal rate of hypochlorite after three operations of applying different voltages and currents in the water purification device 30 of the present embodiment. In the three operations, water respectively contained 1.85 mg/L, 1.80 mg/L, and 1.73 mg/L of hypochlorite before flowing into the water inlet 300e1 of the water purification device 30.

TABLE 1

| Power Applied (W) | | | Oxidation Reduction | Time Passed After | Removal Amount of | Removal Rate of |
|---|---|---|---|---|---|---|
| Current (A) | Voltage (V) | pH Value | Potential (mV) | Applying Power (s) | Hypochlorite (mg/L) | Hypochlorite (mg/L) | Hypochlorite (%) |
| 0.00 | 0.0 | 8.68 | 680 | 0 | 1.85 | — | — |
| 0.30 | 2.7 | 8.56 | 233 | 60 | 0.98 | 0.87 | 47 |
| 0.30 | 2.7 | 8.55 | 233 | 120 | 0.95 | 0.90 | 49 |
| 0.30 | 2.7 | 8.55 | 201 | 180 | 0.95 | 0.90 | 49 |

TABLE 2

| Power Applied (W) | | | Oxidation Reduction | Time Passed After | Removal Amount of | Removal Rate of |
|---|---|---|---|---|---|---|
| Current (A) | Voltage (V) | pH Value | Potential (mV) | Applying Power (s) | Hypochlorite (mg/L) | Hypochlorite (mg/L) | Hypochlorite (%) |
| 0.00 | 0.0 | 8.66 | 627 | 0 | 1.80 | — | — |
| 0.40 | 3.1 | 8.59 | 353 | 60 | 0.52 | 1.28 | 71 |
| 0.40 | 3.1 | 8.58 | 359 | 120 | 0.49 | 1.31 | 73 |
| 0.40 | 3.1 | 8.58 | 293 | 180 | 0.49 | 1.31 | 73 |

TABLE 3

| Power Applied (W) | | | Oxidation Reduction | Time Passed After | Removal Amount of | Removal Rate of |
|---|---|---|---|---|---|---|
| Current (A) | Voltage (V) | pH Value | Potential (mV) | Applying Power (s) | Hypochlorite (mg/L) | Hypochlorite (mg/L) | Hypochlorite (%) |
| 0.00 | 0.0 | 8.61 | 672 | 0 | 1.73 | — | — |
| 0.50 | 3.5 | 8.58 | 272 | 60 | 0.01 | 1.72 | 99 |
| 0.50 | 3.5 | 8.57 | 263 | 120 | 0.01 | 1.72 | 99 |
| 0.50 | 3.5 | 8.57 | 261 | 180 | 0.02 | 1.71 | 99 |

It can be seen that from Table 1 to Table 3, when a current of 0.3 A and a voltage of 2.7 V were applied to the water purification device 30, the removal rate of hypochlorite after 180 seconds was 49%, and when a current of 0.50 A and a voltage of 3.5 V of were applied to the water purification device 30, the removal rate of hypochlorite after 60 seconds reached as high as 99%. As such, the present example verifies that the water purification device 30 has a favorable removal rate of hypochlorite in water, meaning that the water purification device 30 of the present example increases efficiency of reducing hypochlorite to chloride ions. Moreover, a removal rate of 99% of hypochlorite can be achieved by applying merely a current of 0.50 A and a voltage of 3.5 V to the water purification device 30 of the present embodiment, meaning that the water purification device 30 of the present embodiment requires less energy to remove hypochlorite with high efficiency.

Example 2

Figure 5:
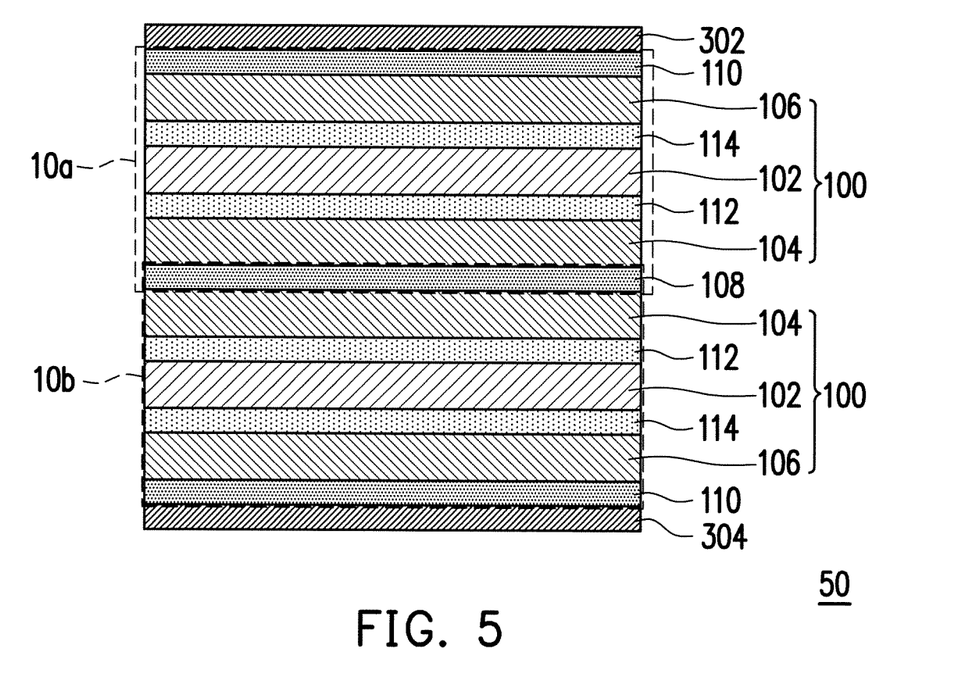
FIG. 5 is a schematic cross-sectional view of a water purification device according to an exemplary embodiment of the disclosure.

FIG. 5 is a schematic cross-sectional view of a water purification device according to some exemplary embodiments of the disclosure.

In the present example, the embodiment of FIG. 5 is taken for example, and a water purification device 50 includes the two electrolytic reduction modules 10a and 10b. Components of the electrolytic reduction modules included in the water purification device 50 are identical to the components of the electrolytic reduction module 10a or 10b included in the water purification device 30. The electrolytic reduction module 10b of the water purification device 50 is taken for example, and the baffle 108 and the baffle 110 of the electrolytic reduction module 10b are respectively the outermost components of the electrolytic reduction module 10b. The cathode 104 is sandwiched between the anode 102 and the baffle 108, and the cathode 106 is sandwiched between the anode 102 and the baffle 110. In the present example, in the water purification device 50, a thickness of the anode 102 is 0.5 μm, a thickness of each of the cathodes 104 and 106 is 3.5 mm, a thickness of each of the baffles 108 and 110 is 2 mm, and a length, a width, and a height of the water purification device 50 respectively are 16 cm, 5.4 cm, and 3.2 cm.

After water containing 1.73 mg/L of hypochlorite flowed into the water purification device 50 from a water inlet, water flowed at a rate of 7 liter/minute, and a current of 1 A and a voltage of 6.8 V were applied to the water purification device 50 through a conventional power generation device. Accordingly, an aqueous solution in the purification device 50 underwent electrolysis reaction after receiving power. The removal rate of hypochlorite was 38.73% after 180 seconds.

Example 3

Figure 6:
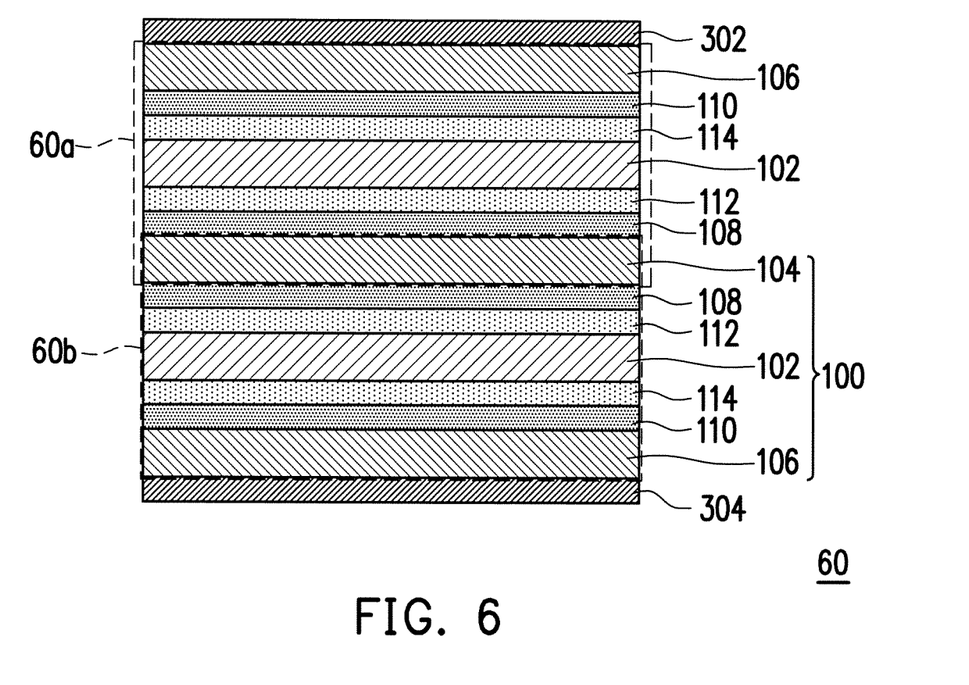
FIG. 6 is a schematic cross-sectional view of a water purification device according to another exemplary embodiment of the disclosure.

FIG. 6 is a schematic cross-sectional view of a water purification device according to some other exemplary embodiments of the disclosure.

In the present example, the embodiment of FIG. 6 is taken for example, and a water purification device 60 includes two electrolytic reduction modules 60a and 60b. The electrolytic reduction modules included in the water purification device 60 are similar to that included in the water purification device 30, but the electrolytic reduction modules included in the water purification devices 60 and 30 are slightly different. A difference therebetween is described with reference to the electrolytic reduction module 60b of the water purification device 60. In the present experiment embodiment, the cathode 104 and the cathode 106 of the electrolytic reduction module 60b are components respectively located at outermost sides of the electrolytic reduction module 60b. The baffle 108 is sandwiched between the anode 102 and the cathode 104, and the baffle 110 is sandwiched between the anode 102 and the cathode 106. From another aspect, the water purification device 60 includes two anodes 102, three cathodes 104 and 106, and four baffles 108 and 110. In the present example, in the water purification device 60, a thickness of the anode 102 is 0.5 μm, a thickness of each of the cathodes 104 and 106 is 3.5 mm, a thickness of each of the baffles 108 and 110 is 2 mm, and a length, a width, and a height of the water purification device 60 respectively are 25 cm, 9.5 cm, and 4.5 cm.

After water containing 1.75 mg/L of hypochlorite flowed into the water purification device 60 from a water inlet, water flowed at a rate of 7 liter/minute, and a current of 1 A and a voltage of 6.8V were applied to the water purification device 60 through a conventional power generation device. Accordingly, an aqueous solution in the purification device 60 underwent electrolysis reaction after receiving power. The removal rate of hypochlorite was 33.62% after 180 seconds.

It can be seen that from example 2 and example 3, compared to the water purification device 60, reduction efficiency (efficiency of reducing hypochlorite to chloride ions) of the water purification device 50 is greater. In other words, the removal rate of hypochlorite is greater when the baffles 108 and 110 are disposed at outer sides of the electrolytic reduction modules 10a and 10b as in the water purification device 50.

In view of the foregoing, in the embodiments of the disclosure, the specific surface areas of the first cathode and the second cathode are significantly greater that the specific surface area of the anode in the electrolytic reduction module. Accordingly, the contact area between water, the first cathode, and the second cathode is considerably increased, and that efficiency of removing free available residual chlorine from water is enhanced. Furthermore, the material of the anode according to the embodiments of the disclosure includes titanium-based iridium oxide having a low hydrogen evolution potential, and thus, free available residual chlorine in water is prevented from oxidizing at the anode to generate chlorine. In addition, in the electrolytic reduction module provided by the embodiments of the disclosure, the first baffle and the second baffle include the meandering openings, as such time of water being in contact with the first cathode and the second cathode when flowing inside is increased, and that efficiency of removing free available residual chlorine in water is enhanced. Furthermore, the water purification device of the embodiments of the disclosure includes the foregoing electrolytic reduction module, and thus is able to provide greater efficiency of removing free available residual chlorine. Moreover, the first baffle and the second baffle of the embodiments of the disclosure can be shared by the two adjacent electrolytic reduction modules. Hence, components required to be disposed in the water purification device are reduced, and that the structure of the water purification device is simplified, and the cost of manufacturing the water purification device are reduced.

It will be apparent to those skilled in the art that various modifications and variations can be made to the disclosed embodiments without departing from the scope or spirit of this disclosure. In view of the foregoing, it is intended that the disclosure covers modifications and variations provided that they fall within the scope of the following claims and their equivalents.

The invention claimed is:

1. An electrolytic reduction module, comprising:
   an electrode set, comprising:
      an anode; and
      a first cathode and a second cathode; and
   a first baffle and a second baffle,
   wherein the anode is disposed between the first cathode and the second cathode, the first cathode is disposed between the first baffle and the anode, and the second cathode is disposed between the second baffle and the anode,
   wherein the first baffle and the second baffle respectively have a meandering opening,
   wherein the meandering opening comprises a starting end where water flows into the first baffle and an end point where water flows out of the first baffle,
   wherein specific surface areas of the first cathode and the second cathode are respectively 2 to 10 times of a specific surface area of the anode.

2. The electrolytic reduction module as claimed in claim 1, further comprising a first isolation structure and a second isolation structure, wherein the first isolation structure is disposed between the anode and the first cathode, and the second isolation structure is disposed between the anode and the second cathode.

3. The electrolytic reduction module as claimed in claim 2, wherein the first isolation structure and the second isolation structure comprise a mesh, a pad, a porous structure, or a combination of the foregoing.

4. The electrolytic reduction module as claimed in claim 1, wherein hydrogen evolution potentials of the first cathode and the second cathode in an aqueous solution with 0.2 wt % NaClO range from −1.9 V to −2.5 V.

5. The electrolytic reduction module as claimed in claim 1, wherein an oxygen evolution potential of the anode in an aqueous solution with 0.2 wt % NaClO ranges from 0.8 V to 1.3 V.

6. The electrolytic reduction module as claimed in claim 1, wherein a material of the anode comprises titanium based iridium oxide ($Ti/IrO_2$).

7. The electrolytic reduction module as claimed in claim 1, wherein materials of the first cathode and the second cathode comprise carbon.

8. The electrolytic reduction module as claimed in claim 7, wherein the materials of the first cathode and the second cathode comprise graphite felt.

9. A water purification device, comprising:
   a housing, comprising a water inlet and a water outlet; and
   a plurality of electrolytic reduction modules, wherein each of the electrolytic reduction modules comprises an electrode set, and the electrode set comprises:
      an anode;
      a first cathode and a second cathode; and
      a first baffle and a second baffle, the first baffle or the second baffle being shared by adjacent two of the electrolytic reduction modules,
   wherein the anode is disposed between the first cathode and the second cathode, the first cathode is disposed between the first baffle and the anode, and the second cathode is disposed between the second baffle and the anode,
   wherein the first baffle and the second baffle respectively have a meandering opening,
   wherein the meandering opening comprises a starting end where water flows into the first baffle and an end point where water flows out of the first baffle,
   wherein specific surface areas of the first cathode and the second cathode are respectively 2 to 10 times of a specific surface area of the anode.

10. The water purification device as claimed in claim 9, wherein the electrolytic reduction modules are four electrolytic reduction modules.

11. The water purification device as claimed in claim 9, further comprising a first water blocking pad and a second water blocking pad, wherein the electrolytic reduction modules are disposed between the first water blocking pad and the second water blocking pad.

12. The water purification device as claimed in claim 9, wherein hydrogen evolution potentials of the first cathode and the second cathode in an aqueous solution of 0.2 wt % NaClO range from −1.9 V to −2.5 V.

13. The water purification device as claimed in claim 9, wherein a material of the anode comprises titanium based iridium oxide ($Ti/IrO_2$).

14. The water purification device as claimed in claim 9, wherein materials of the first cathode and the second cathode comprise carbon.

15. The water purification device as claimed in claim 14, wherein the materials of the first cathode and the second cathode comprise graphite.

16. The water purification device as claimed in claim 14, wherein the materials of the first cathode and the second cathode comprise graphite felt.

* * * * *